US007756647B2

(12) United States Patent
Auber et al.

(10) Patent No.: US 7,756,647 B2
(45) Date of Patent: *Jul. 13, 2010

(54) FILL LEVEL MEASUREMENT DEVICE

(75) Inventors: Herbert Auber, Schramberg (DE);
Martin Mellert, Steinach (DE); Martin Mosmann, Wolfach (DE); Thomas Oehler, Gengenbach (DE)

(73) Assignee: Vega Grieshaber KG, Wolfach (DE)

( * ) Notice: Subject to any disclaimer, the term of this patent is extended or adjusted under 35 U.S.C. 154(b) by 277 days.

This patent is subject to a terminal disclaimer.

(21) Appl. No.: 11/407,552

(22) Filed: Apr. 19, 2006

(65) Prior Publication Data

US 2006/0217904 A1   Sep. 28, 2006

Related U.S. Application Data

(60) Continuation of application No. 10/402,905, filed on Mar. 28, 2003, now Pat. No. 7,110,894, which is a division of application No. 09/659,186, filed on Sep. 12, 2000, now Pat. No. 6,769,300.

(30) Foreign Application Priority Data

Dec. 17, 1999   (DE)   ............................... 199 61 156

(51) Int. Cl.
*G01F 23/00* (2006.01)
(52) U.S. Cl. ........................................................ 702/55
(58) Field of Classification Search .................. 702/45, 702/50, 55, 100, 80, 126, 127, 166, 198; 73/290 R, 291
See application file for complete search history.

(56) References Cited

U.S. PATENT DOCUMENTS

| 5,377,128 A | 12/1994 | McBean | 702/91 |
| 5,675,092 A | 10/1997 | Denis | 73/861.78 |
| 5,751,611 A | 5/1998 | Jamieson | 345/35 |
| 5,947,372 A | 9/1999 | Tiernan | 236/94 |

(Continued)

FOREIGN PATENT DOCUMENTS

DE   3639 455   5/1988

(Continued)

OTHER PUBLICATIONS

English Translation of EP 501 900, Feb. 1992.*

(Continued)

*Primary Examiner*—Michael P Nghiem
(74) *Attorney, Agent, or Firm*—O'Shea Getz P.C.

(57) ABSTRACT

A fill level measurement device senses the fill level of an object within a container. A fill level measurement sensor provides a sensed fill level signal indicative of the level within the container. A signal processing device is responsive to the sensed fill level signal and includes a first removable and replaceable component that includes a first memory device. The signal processing device also includes a second removable and replaceable component that includes a second memory device containing component customer parameter data. The second removable and replaceable component transmits the component customer parameter data to the first removable and replaceable component via a data link that electrically isolates the first and second removable and replaceable components, and the first removable and replaceable component stores the received component customer parameter data into the first non-volatile memory device.

7 Claims, 1 Drawing Sheet

U.S. PATENT DOCUMENTS

| | | | |
|---|---|---|---|
| 6,594,275 B1 * | 7/2003 | Schneider | 370/465 |
| 6,769,300 B1 * | 8/2004 | Auber et al. | 73/290 R |
| 7,110,894 B2 * | 9/2006 | Auber et al. | 702/55 |
| 2006/0141931 A1 * | 6/2006 | Da Silva Neto | 455/41.1 |

FOREIGN PATENT DOCUMENTS

| | | | |
|---|---|---|---|
| DE | 40 04 939 | | 8/1991 |
| EP | 0 501 900 | | 9/1992 |
| EP | 707 200 | * | 4/1996 |
| EP | 1 108 991 | * | 6/2001 |
| EP | 1 108 992 | * | 6/2001 |
| FR | 2 640 747 | | 6/1990 |
| FR | 2 739 929 | | 4/1997 |
| JP | 2000074707 | | 3/2000 |

OTHER PUBLICATIONS

WiseGeek, "What is Non-Volatile Memory?", 2003-2009.*

English Abstract of EP 707 200, Apr. 1996.*

* cited by examiner

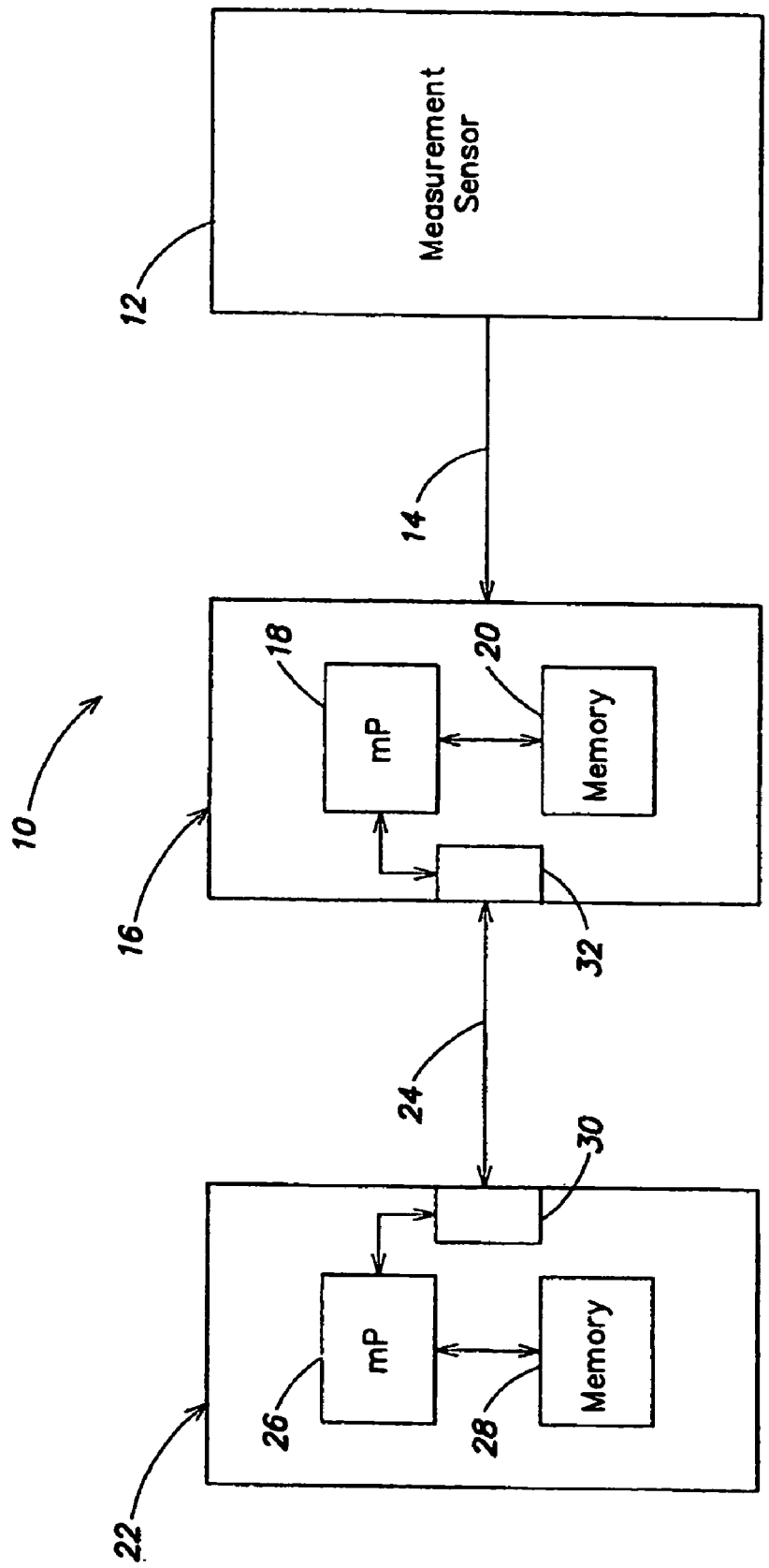
FIGURE

FILL LEVEL MEASUREMENT DEVICE

CROSS REFERENCE TO RELATED APPLICATION

This application is a continuation of application Ser. No. 10/402,905, filed on Mar. 28, 2003, now issued as U.S. Pat. No. 7,110,894, which is a divisional of application Ser. No. 09/659,186, filed on Sep. 12, 2000 now issued as U.S. Pat. No. 6,769,300, entitled "FILL LEVEL MEASUREMENT DEVICE AND A METHOD FOR OPERATING SUCH A FILL LEVEL MEASUREMENT DEVICE", which is hereby incorporated by reference.

BACKGROUND OF THE INVENTION

The present invention relates to the field of fill level sensors, and in particular to fill level sensors that include various removable and replaceable components that are electrically isolated from one another.

To measure the fill level of solid bulk goods or liquids in a container, several measurement techniques are known. For example, fill level measurements that employ radar, vibrating rods, pressure, and capacitance measurements are known.

These known sensing techniques often include a measurement sensor that is connected to a converter. This common connection on the converter and measurement sensor is often referred to as the process connection. The supply lines and the electric measurement lines of the measurement sensor are connected to those of the converter.

Voltage flashovers can occur at the measurement sensor, which destroy parts of the measurement sensor or the electronic analytical device. For applications in hazardous areas, precautions are prescribed, such as for example minimum distances between the electric lines, to assure reliable protection against explosions.

The data generated by the measurement sensor are conducted to a measurement data converter, which for example converts them into digital data, and transmits the digital data to an electronic analytical device. Before the fill level measurement device is started, customer-specific parameter data must be entered into the fill level measurement device. When the measurement data converter or the electronic analytical device are replaced, these customer-specific parameter data must be re-entered into the fill level measurement device, which results in undesirable complication.

Therefore, there is a need for a fill level measurement device suitable for operation in hazardous area.

SUMMARY OF THE INVENTION

A fill level measurement device includes at least first and second removable and replaceable components that each include a non-volatile memory device. The device senses that the first removable and replaceable component has been inserted into the fill level measurement device, and provides a sensed signal indicative thereof. In response to the sensed signal, component customer parameter data is received at the first removable and replaceable component, and the received component customer parameter data is written into the non-volatile memory device of the first removable and replaceable component.

The measurement data converter includes a first non-volatile memory, and the electronic analytical device contains a second non-volatile memory, and that the same parameter data are redundantly stored in both memories.

The inventive fill level measuring device includes a measurement sensor, a measurement data converter, and an electronic analytical device. The measurement sensor is situated at the measurement point and measures the fill level, for example in a container or a tank. The measurement sensor is connected to the measurement data converter through a line. The measurement data converter generally is situated near the measurement sensor. The measurement data converter is connected to an electronic analytical device through another line. The measurement sensor transmits its measured data to the measurement data converter, which converts them into digital data, and transmits them to the electronic analytical device.

The measurement data converter contains a first non-volatile memory and the electronic analytical device contains a second non-volatile memory. The same parameter data, which are absolutely necessary to operate the fill level measurement device, are redundantly stored in both of these memories.

If the measurement data converter is replaced because of a defect or for maintenance purposes, the parameter data, which are redundantly stored in the memory of the electronic analytical device, are automatically read into the memory of the new measurement data converter as soon as this has been installed. Similarly, when the electronic analytical device is replaced (e.g., because of a defect or for maintenance purposes), the parameter data redundantly stored in the memory of the measurement data converter are automatically read into the memory of the newly installed analytical device. Whether the measurement data converter or the electronic analytical device is replaced, the previously redundantly stored parameter data are again available in both memories as soon as the new device has been installed.

Because the parameter data that are necessary for starting and operating the inventive fill level measurement device are stored redundantly both in the measurement data converter and in the electronic analytical device, they no longer need to be entered anew when one of these two devices is replaced.

These and other objects, features and advantages of the present invention will become more apparent in light of the following detailed description of preferred embodiments thereof, as illustrated in the accompanying drawings.

BRIEF DESCRIPTION OF THE DRAWINGS

The FIGURE is a block diagram illustration of a fill level measurement device.

DETAILED DESCRIPTION OF THE INVENTION

The FIGURE is a block diagram illustration of a fill level measurement device 10. The device 10 includes a measurement sensor 12 that senses the fill level within a container or tank (not shown), and provides a measurement signal on a line 14 to a measurement data converter 16. The measurement data converter 16 includes a microprocessor 18 and a non-volatile memory 20. The measurement data converter 16 is connected to an electronic analytical device 22 via line 24. The electronic analytical device 22 includes a microprocessor 26 and a non-volatile memory 28. The microprocessor 18 is connected to the non-volatile memory 20, while the microprocessor 26 is connected to the non-volatile memory 28. The two microprocessors 18, 26 are connected to one another via the communication link on the line 24.

When fill level measurement device 10 is installed and first operated, the customer-specific parameter data are entered at least into one of the two non-volatile memories 20, 28. The customer-specific parameter data is then automatically read into the other non-volatile memory. However, they can also be read simultaneously into both non-volatile memories.

When the measurement data converter 16 is replaced, the data stored in the non-volatile memory 28 of the electronic analytical device are automatically read, via the line 24, into the non-volatile memory 20 of the newly installed measurement data converter 16. Analogously, when the electronic analytical device 22 is replaced, the data stored in the non-volatile memory 20 of the measurement data converter 16 are automatically read, via the line 24, into the non-volatile memory 28 of the newly installed electronic analytical device 22.

Data transmission between the measurement data converter 16 and the electronic analytical device 22 can be for example asynchronous serial.

It is especially advantageous for the measurement data converter 16 and the electronic analytical device 22 to be electrically isolated. An especially suitable transmission medium between the measurement data converter 16 and the electronic analytical device 22 is for example an optical fiber or an electric conductor, with optocouplers 30, 32 at each end. Besides the data transmission, the transmission of the supply voltage is also electrically decoupled. The electrical isolation achieves a number of advantages.

For example, the supply lines are better protected against flashovers to ground, since no voltage flashover from the process connection to the measurement sensor can occur, because the electronics of the measurement sensor 12 are directly connected to ground.

Ceramic capacitive measurement sensors are used preferably for measuring the fill level, because they are distinguished by a number of advantages. However, ceramic capacitive measurement sensors have parasitic stray capacitances, between the housing and both the measurement capacitance and the reference capacitance. Due to the unavoidable coupling of interference on the lines, especially in the low frequency range, this stray capacitance can cause a relative measurement error up to 50%. The electrical isolation advantageously eliminates this measurement error completely.

In hazardous areas, minimum distances are prescribed between the process connection and the supply lines, which carry supply currents between 4 and 20 mA. However, due to the electrical isolation, the measurement sensor 12 can very simply be built into a metallic process connection. A measurement sensor with a membrane electrode can be built in especially easily, because, due to the electrical decoupling, the membrane electrode can be electrically connected to the metallic process connection. No additional measures need to be taken any longer for protecting against explosion, such as for example safety distances between the process connection and the measurement data converter.

Finally, due to the electrical isolation, the measurement result is no longer garbled by the mutual coupling between the measurement data converter and the electronic analytical device. The electrical isolation thus substantially improves the signal-to-noise ratio.

As already mentioned, the electrical isolation can be realized by an optical fiber and two optocouplers 30, 32, or for example by a transformer.

A first essential advantage of the invention is that the measurement data converter 16 and the electronic analytical device 22 can be replaced while the system is running. A second essential advantage is that, after replacement of the part, no new adjustment is required, because the required data are stored redundantly and are automatically read into the empty memory of the newly installed part. The invention thus substantially reduces the expenditure of time and thus also the costs for maintenance and repair.

Although the present invention has been shown and described with respect to several preferred embodiments thereof, various changes, omissions and additions to the form and detail thereof, may be made therein, without departing from the spirit and scope of the invention.

What is claimed is:

1. A fill level measuring device, comprising:
   a measurement sensor is connected to a replaceable converter that includes a first optocoupler;
   a replaceable electronic analytical device that includes a second optocoupler; and
   an optical fiber that provides a data communication channel between the first and second optocouplers,
   wherein the fill level measuring device is configured such that when the replaceable electronic analytical device is replaced with a newly installed electronic analytical device, data from the replaceable converter is transmitted to the newly installed electronic analytical device via the optical fiber.

2. A fill level measurement device, comprising:
   a measurement sensor that provides a sensed fill level signal to a removable and replaceable measurement data converter that includes a first memory; and
   a removable and replaceable electronic analytical device that includes a second memory;
   wherein when the measurement data converter is replaced with a newly installed measurement data converter, data stored in the second memory is transmitted to a first memory of the newly installed measurement data converter via an optical data link between the electronic analytical device and the newly installed measurement data converter.

3. The fill level measurement device of claim 2, wherein the measurement data converter comprises a first optocoupler and the electronic analytical device comprises a second optocoupler, where the measurement data converter is connected to the optical data link via the first optocoupler and the electronic analytical device is connected to the optical data link via the second optocoupler.

4. A fill level measurement device that senses the fill level of an object within a container, comprising:
   a fill level measurement sensor that provides a sensed fill level signal indicative of the level within the container;
   a signal processing device that is responsive to said sensed fill level signal and includes a first removable and replaceable component that includes a first memory device;
   a second removable and replaceable component that includes a second memory device containing customer parameter data; and
   wherein, when the first removable and replaceable component is replaced with a newly installed first removable and replaceable component, the second removable and replaceable component transmits the customer parameter data to the newly installed first removable and replaceable component via a data link comprising means for electrically isolating the newly installed first removable and replaceable component from the second removable and replaceable component, and the newly installed first removable and replaceable component stores the received component customer parameter data into a first non-volatile memory device of the newly installed first removable and replaceable component.

5. The fluid level measurement device of claim 4, wherein the data link comprises an asynchronous serial data link between the first and second removable and replaceable components.

6. The fluid level measurement device of claim 4, wherein the data link comprises a serial data link between said first and second removable and replaceable components.

7. The fluid level measurement device of claim 4, wherein the first removable and replaceable component comprises a first optocoupler that connects the first removable and replaceable component to the data link, and the second removable and replaceable component comprises a second optocoupler that connects the second removable and replaceable component to the data link.

* * * * *